Oct. 20, 1925.
F. A. PFEIFER
1,557,611
VEGETABLE CUTTER
Filed June 9, 1922
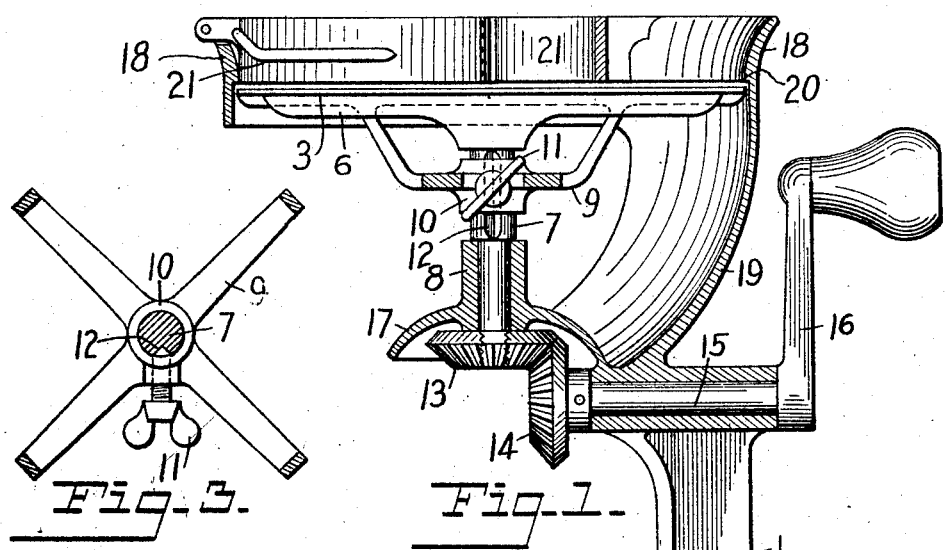
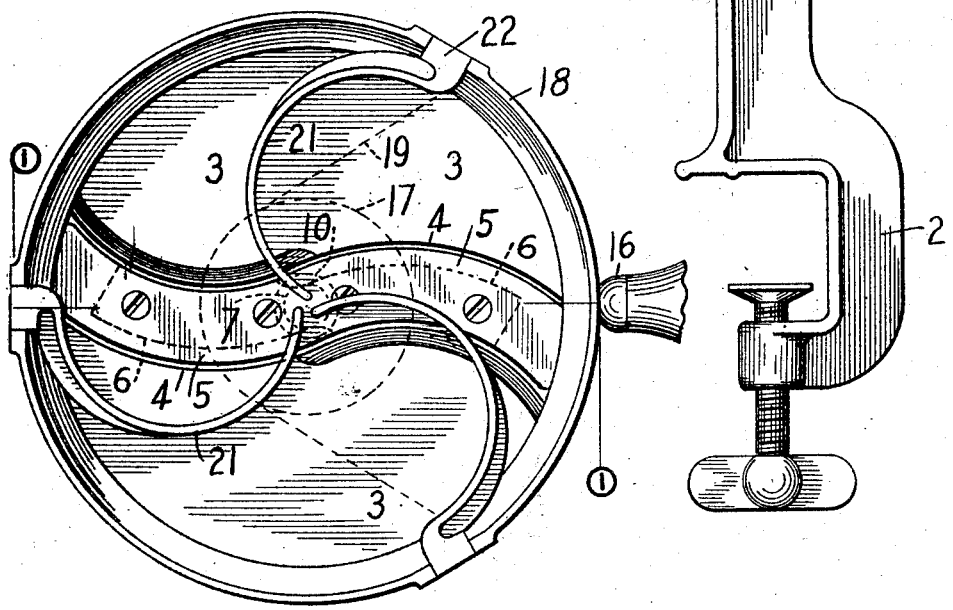
Inventor
FERDINAND A. PFEIFER.

Patented Oct. 20, 1925.

1,557,611

UNITED STATES PATENT OFFICE.

FERDINAND A. PFEIFER, OF SPRINGFIELD, OHIO, ASSIGNOR TO THE EAGLE ENGINEERING COMPANY, OF SPRINGFIELD, OHIO, A CORPORATION OF OHIO.

VEGETABLE CUTTER.

Application filed June 9, 1922. Serial No. 566,926.

*To all whom it may concern:*

Be it known that I, FERDINAND A. PFEIFER, a citizen of the United States, residing at Springfield, in the county of Clark and State of Ohio, have invented certain new and useful Improvements in Vegetable Cutters, of which the following is a specification, reference being had therein to the accompanying drawing.

This invention relates to vegetable cutters and the like and one object of the invention is to provide a simple, inexpensive device of this kind which can be easily operated to rapidly cut vegetables.

A further object of the invention is to provide such a device in which the vegetables to be cut will be supported by the cutting devices and will therefore be held in operative relation to the blades by their own weight.

A further object of the invention is to provide separate guards for supporting large and small vegetables, respectively, against displacement by the action of the cutting device, the smaller guard being movable relatively to the larger guard into and out of its operative position.

Other objects of the invention will appear as the device is described in detail.

In the accompanying drawings Fig. 1 is a side elevation, partly in section, of a cutting device embodying my invention; Fig. 2 is a plan view of the same; and Fig. 3 is a sectional detail view of the spider which carries the disk.

In these drawings I have illustrated one embodiment of my invention and have shown the same as comprising a supporting structure 1 having at its lower end a suitable clamping device 2 for attaching the same to the edge of a table or the like. Mounted upon this supporting structure for rotation about a vertical axis is a disk 3 having therein openings 4 which preferably extend from the center of the disk to the edge thereof. Arranged within these openings and mounted for rotation with the disk are cutter blades 5 the forward edges of which project above the surface of the disk 3 so that they may operatively engage vegetables or other articles resting upon the disk.

In that form of the device here shown the cutter blades are carried by and rigidly secured to arms 6 which in turn are rigidly secured to and if desired may be formed integral with the shaft 7 which is journaled in a bearing 8 carried by the supporting structure 1. The cutter disk 3 is also carried by the shaft 7 but is preferably adjustable axially thereof to enable the relation of the same to the blades to be adjusted so as to regulate the depth of the cut. To this end I have shown the disk as carried by and preferably having formed integral therewith a spider 9, the hub 10 of which is slidably mounted on the shaft 7 and is provided with a set screw 11, the point of which enters a V-shaped groove 12 in the shaft 7 and which serves to rigidly connect the spider and the disk with the shaft in their adjusted positions. The cutter blades and the disk may be rotated in any suitable manner, but as here shown, the shaft 7 has secured to the lower end thereof a beveled gear 13 with which meshes a second beveled gear 14 on a shaft 15 to the outer end of which is secured a crank 16 by means of which the parts are rotated. That part of the supporting structure which carries the bearing 8 is dome-shaped, as shown at 17, to constitute a guard for the gearing.

To prevent the vegetables or other articles which are to be cut from being laterally displaced by the action of the cutters, I have provided a guard 18 which is carried by a part 19 of the supporting structure and which extends about the edge of the disk 3. In the present instance this guard is in the form of a ring, the upper portion of which extends above the surface of the disk 3 a distance sufficient to hold the article against lateral displacement. Preferably, the inner surface of the guard is provided with a circumferential shoulder 20 which is arranged adjacent to, or may overlap, the edge of the disk 3 without the guard coming in contact with the disk. This annular guard is adapted to support large vegetables, such as cabbage, against displacement by the cutters and when the head of cabbage, for instance, is in position on the disk within the guard ring both cutter blades will operate continuously upon the lower surface thereof.

This large guard ring, however, will not operate satisfactorily on small vegetables such as potatoes, cucumbers, and the like, and I therefore provide one or more supplemental guards which are movable into and out of operative position with relation to the cutter disk. There may be such number of these supplemental guards as may seem desirable and in the present instance I have shown three, each of which comprises an arm 21 pivotally mounted at its outer end upon the main guard ring 18, as shown at 22. The guard arms 21 are curved, as shown, and have their inner ends arranged adjacent to the center of the cutter disk. Obviously, when a vegetable is placed upon the cutter disk and brought into contact with the curved side of one of these guard arms it will be effectually held against displacement by the action of the cutter blades. When the cutter is to be used for large vegetables the supplemental cutters 21 are swung outwardly so that they will hang down on the outer side of the main guard ring and will not interfere with the operation of the cutting devices. When smaller vegetables are to be cut one or more of the supplemental guards are moved into operative relation to the cutter disk, as shown in the drawings. It will be noted that the guard arms are pivoted to the main guard ring 18 at their upper edges and that their lower end portions bear against the guard ring 18 so as to limit their downward movement about their axes, thus supporting the same out of contact with the cutter disk 3 and the blades 5.

The part 19 of the supporting structure which carries the main guard ring 18 is preferably shaped to form a chute which will direct the cut vegetables inwardly toward a suitable receptacle.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In a cutting device of the character described, a rigid supporting structure having a vertical bearing, a shaft journaled in said vertical bearing, means for rotating said shaft, a disk rigidly secured to the upper end of said shaft and having its upper surface in a plane above the upper end of said shaft so that said upper surface is unobstructed, said disk having openings therethrough extending from the center thereof to its opposite edges, cutter blades mounted in the respective openings in said disk, rigidly secured to said shaft and having their inner ends extending to the center of said disk whereby said blades will remove the entire lower surface of an article resting upon and covering the whole of said disk, and a guard extending circumferentially of said disk to position said article with relation thereto.

2. In a cutting device of the character described, a rigid supporting structure having a vertical bearing, a shaft journaled in said vertical bearing, means for rotating said shaft, a disk rigidly secured to the upper end of said shaft and having its upper surface in a plane above the upper end of said shaft so that said upper surface is unobstructed, said disk having openings therethrough extending from the center thereof to its opposite edges, cutter blades mounted in the respective openings in said disk, rigidly secured to said shaft and having their inner ends extending to the center of said disk, whereby said blades will remove the entire lower surface of an article resting upon and covering the whole of said disk, said supporting structure having an inclined portion extending upwardly and outwardly from the lower portion of said bearing and curved about its longitudinal axis to form a chute, and a guard secured to the upper end of said chute and arranged circumferentially of said disk.

3. In a cutting device of the character described, a rigid supporting structure having a horizontal bearing and a vertical bearing, a shaft journaled in said horizontal bearing, means for rotating said shaft, a second shaft journaled in said vertical bearing and having a geared connection with the first mentioned shaft, a disk rigidly secured to said second shaft and having its upper surface in a plane above the upper end of said shaft so that said upper surface is unobstructed, said disk having openings therethrough extending from the center thereof to the opposite edges thereof, cutter blades mounted in the respective openings in said disk, rigidly secured to said second shaft and having their inner ends extending to the center of said disk, whereby said blades will remove the entire lower surface of an article resting upon and covering the whole of said disk, said supporting structure having an inclined portion extending upwardly and outwardly from the inner portion of said horizontal bearing and curved about its longitudinal axis to form a chute, and a dome shaped guard carried by said vertical bearing and the lower end of said chute, and extending over the geared connection between said shafts.

4. In a cutting device of the character described, a supporting structure, a disk rotatably mounted on said structure and having an opening therethrough, a cutting blade arranged in said opening and rotatable with said disk, a normally stationary guard mounted adjacent to the edge of said disk to position the article to be cut with relation thereto, a supplemental guard pivotally mounted on the stationary guard for movement into and out of operative relation with the first mentioned guard, and means for rotating said disk.

5. In a device of the character described, a disk mounted for rotation about a vertical axis, a cutting blade rotatable with said disk, an annular guard extending about said disk, and a supplemental guard pivotally mounted on the first mentioned guard and movable into and out of a position within said first mentioned guard.

6. In a device of the character described, a disk mounted for rotation about a vertical axis, a cutting blade rotatable with said disk, an annular guard extending about said disk, and a supplemental guard pivotally mounted on the first mentioned guard and movable into and out of a position within said first mentioned guard, said guards having cooperating parts to support said supplemental guard out of engagement with said disk.

7. In a device of the character described, a disk mounted for rotation about a vertical axis, a cutting blade rotatable with said disk, an annular guard extending about said disk, a plurality of supplemental guards pivotally mounted on said annular guard, spaced about the same and movable into and out of operative positions within said annular guard.

8. In a cutting device, a face plate and a cutting blade mounted for rotation about a common axis, a normally stationary device mounted adjacent to the edge of the face plate to hold the article to be cut against displacement with relation to said face plate, and a supplemental device permanently mounted for movement relatively to the first mentioned device into and out of a position to support a smaller article against displacement with relation to said face plate.

9. In a cutting device, a face plate and a cutting blade mounted for rotation about a common axis, a normally stationary device mounted adjacent to the edge of said face plate to hold the article to be cut against displacement with relation to said face plate, and a supplemental device permanently mounted on said stationary device for movement into and out of a position adjacent to said face plate to hold an article against displacement with relation thereto.

10. In a cutting device, a supporting structure, and a face plate and cutting blade mounted on said structure for rotation about a common axis, a normally stationary device carried by said supporting structure and arranged adjacent to the edge of said face plate to hold the article to be cut against displacement with relation to said face plate, and a plurality of supplemental devices carried by said supporting structure and all movable into and out of positions to hold articles against displacement with relation to said face plate.

11. In a cutting device of the character described, a supporting structure, a disk rotatably mounted on said structure and having an opening therethrough, a cutting blade arranged in said opening and rotatable with said disk, a guard mounted adjacent to the edge of said disk to position the article to be cut with relation thereto, a supplemental guard movably mounted with relation to said first mentioned guard, and freely movable into and out of operative relation to said disk, and means for rotating said disk.

12. In a cutting device, a supporting structure, a face plate and a cutting blade mounted on said supporting structure for rotation about a common axis, a pivoted guard arm carried by said supporting structure and movable into and out of a position above but out of contact with said face plate and adapted to hold an article against displacement with relation to said face plate.

In testimony whereof, I affix my signature hereto.

FERDINAND A. PFEIFER.